(12) United States Patent
Yamada

(10) Patent No.: US 7,143,351 B1
(45) Date of Patent: Nov. 28, 2006

(54) IMAGE DISPLAY DEVICE AND DISPLAYING METHOD

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/611,367

(22) Filed: Jul. 6, 2000

(30) Foreign Application Priority Data

Jul. 7, 1999 (JP) ................................. 11-192476

(51) Int. Cl.
*H04N 7/32* (2006.01)

(52) U.S. Cl. ....................................... 715/719; 348/700

(58) Field of Classification Search ................ 345/720, 345/721, 722, 723, 724, 725, 726, 804, 807, 345/704, 638, 650; 715/719–726; 348/700, 348/701, 565, 416

See application file for complete search history.

(56) References Cited

U.S. PATENT DOCUMENTS

| 4,714,961 | A | * | 12/1987 | Haubold et al. | 358/209 |
|---|---|---|---|---|---|
| 5,282,255 | A | * | 1/1994 | Bovik et al. | 382/239 |
| 5,428,774 | A | * | 6/1995 | Takahashi et al. | 345/731 |
| 5,481,712 | A | * | 1/1996 | Silver et al. | 345/723 |
| 5,519,452 | A | * | 5/1996 | Parulski | 348/620 |
| 5,537,528 | A | * | 7/1996 | Takahashi | 345/731 |
| 5,592,226 | A | * | 1/1997 | Lee et al. | 375/240.14 |
| 5,602,592 | A | * | 2/1997 | Mori et al. | 375/240.12 |
| 5,610,661 | A | * | 3/1997 | Bhatt | 348/446 |
| 5,638,124 | A | * | 6/1997 | Soda et al. | 375/240.12 |
| 5,809,245 | A | * | 9/1998 | Zenda | 345/717 |
| 5,828,421 | A | | 10/1998 | Boyce et al. | |
| 5,832,121 | A | * | 11/1998 | Ando | 382/236 |
| 5,862,508 | A | * | 1/1999 | Nagaya et al. | 701/209 |
| 5,978,032 | A | * | 11/1999 | Yukitake et al. | 375/240.16 |
| 6,016,139 | A | * | 1/2000 | Terasawa et al. | 345/169 |
| 6,023,287 | A | * | 2/2000 | Kimura et al. | 348/39 |
| 6,057,893 | A | * | 5/2000 | Kojima et al. | 348/700 |
| 6,144,972 | A | * | 11/2000 | Abe et al. | 707/501 |
| 6,215,505 | B1 | * | 4/2001 | Minami et al. | 345/473 |
| 6,278,466 | B1 | * | 8/2001 | Chen | 345/473 |
| 6,289,051 | B1 | * | 9/2001 | Bellers et al. | 375/240.16 |
| 6,323,877 | B1 | * | 11/2001 | Katoh et al. | 345/638 |
| 6,356,314 | B1 | * | 3/2002 | Takebe | 348/564 |
| 6,380,986 | B1 | * | 4/2002 | Minami et al. | 348/699 |
| 6,445,741 | B1 | * | 9/2002 | Bellers et al. | 375/240.16 |
| 6,493,466 | B1 | * | 12/2002 | Honda et al. | 382/236 |
| 6,600,835 | B1 | * | 7/2003 | Ishikawa | 382/236 |
| 6,608,938 | B1 | * | 8/2003 | Honda et al. | 382/236 |
| 6,621,979 | B1 | * | 9/2003 | Eerenberg et al. | 386/68 |
| 6,658,056 | B1 | * | 12/2003 | Duruoz et al. | 375/240 |
| 6,693,676 | B1 | * | 2/2004 | Yamaguchi et al. | 348/452 |
| 6,724,434 | B1 | * | 4/2004 | Aaltonen | 348/565 |
| 6,950,146 | B1 | * | 9/2005 | Brett et al. | 348/556 |

FOREIGN PATENT DOCUMENTS

| EP | 0 567 932 A | 11/1993 |
|---|---|---|
| JP | 62-72287 | 4/1987 |

(Continued)

*Primary Examiner*—Steven P. Sax
(74) *Attorney, Agent, or Firm*—Foley & Lardner LLP

(57) ABSTRACT

An image display device for playing-back and displaying binary image data after decoding the above by the frame, comprises an image judging unit for judging the current frame to be a moving image or a static image, based on the time interval between the frames which have been decoded in the past, a scan converting unit for performing scan conversion on the current frame, depending on the judgment result by the image judging unit, and a display for displaying the decoded image through sequential scanning.

12 Claims, 5 Drawing Sheets

FOREIGN PATENT DOCUMENTS

| | | |
|---|---|---|
| JP | 63-149973 A | 6/1988 |
| JP | 03-003495 A | 1/1991 |
| JP | 6-205375 | 7/1994 |
| JP | 08-336120 A | 12/1996 |
| JP | 10-126749 A | 5/1998 |
| JP | 10-191257 | 7/1998 |
| WO | WO 94 30006 A | 12/1994 |

* cited by examiner

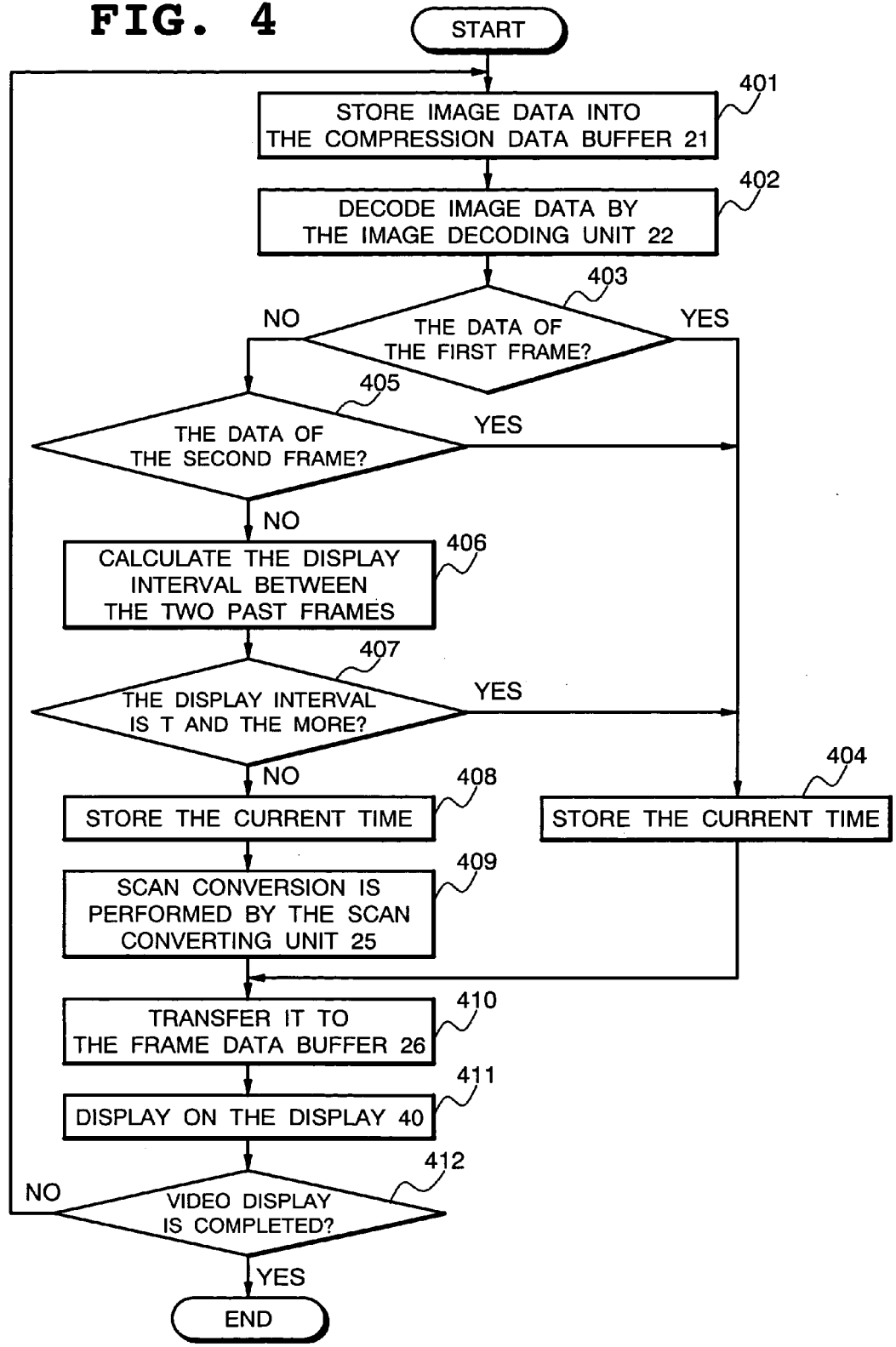

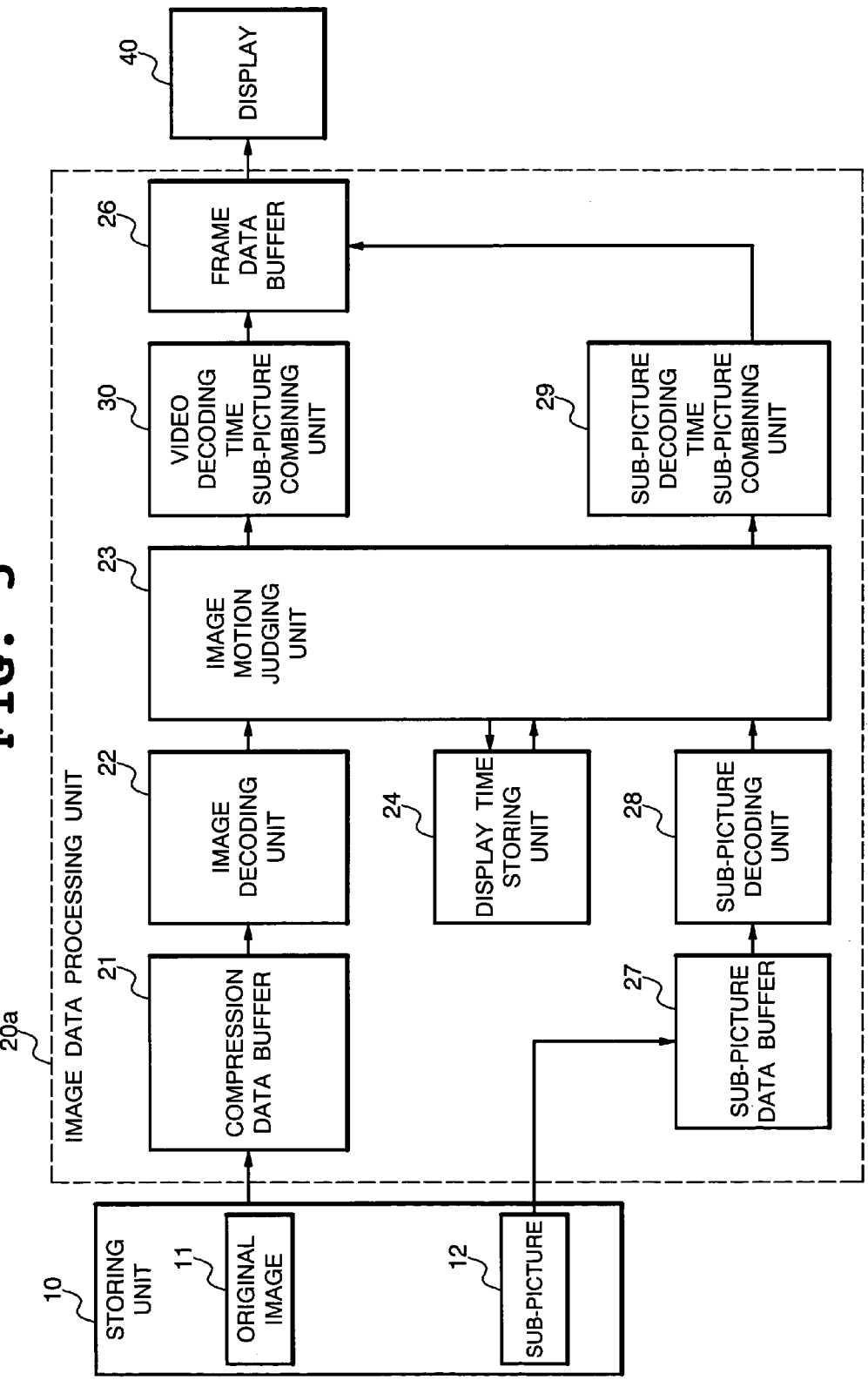

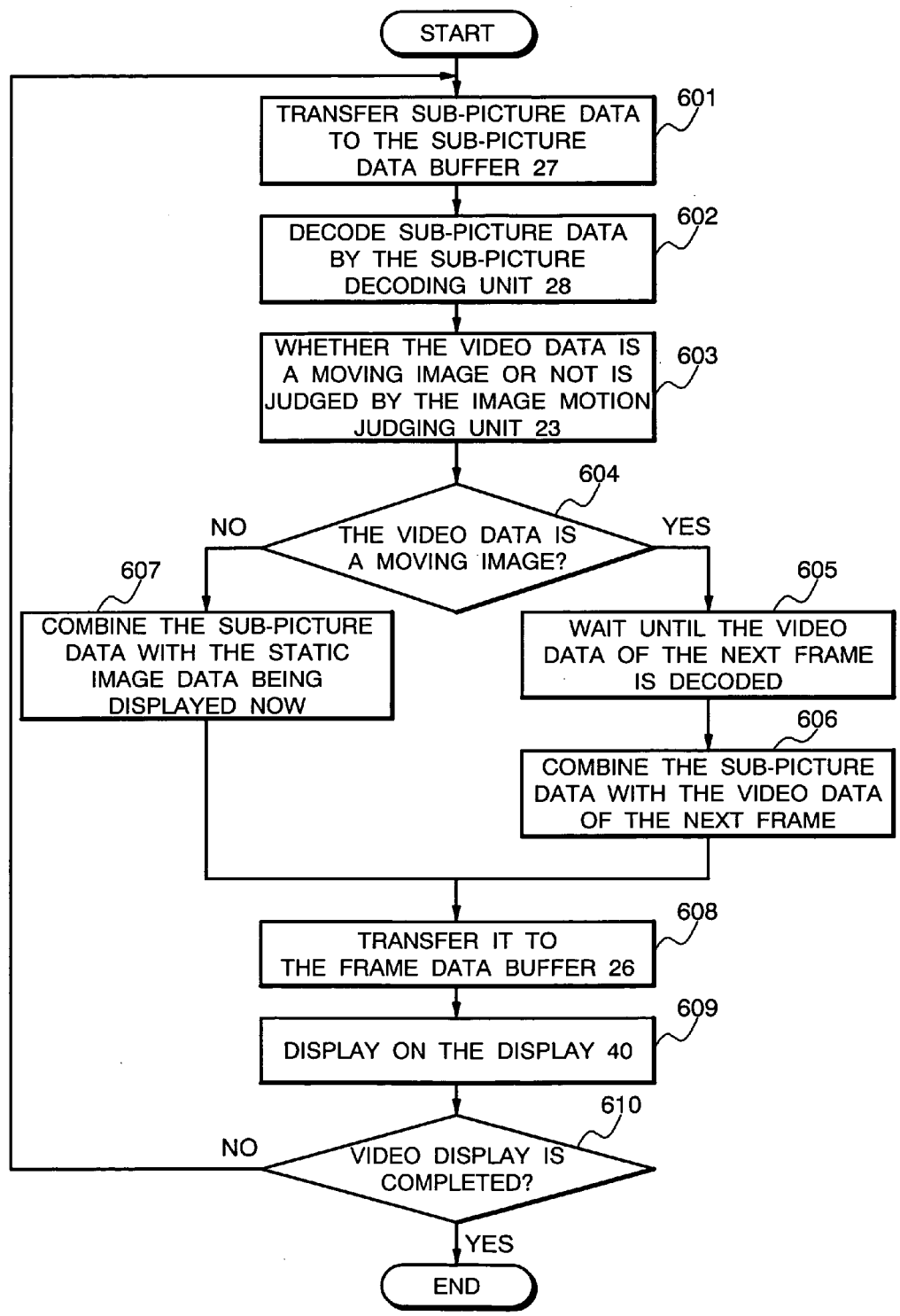

IMAGE DISPLAY DEVICE AND DISPLAYING METHOD

BACKGROUNDS OF THE INVENTION

1. Field of the Invention

The present invention relates to an image display device and displaying method, and more particularly to an image display device and displaying method of decoding binary image data compressed in the MPEG (Motion Picture Expert Group)-2, for displaying the same data.

2. Description of the Related Art

Roughly speaking, scanning method of a moving picture comprises a sequential scanning method and an interlaced scanning method (interlaced scan: skip scan). In the sequential scanning, all the pixels within one frame are the data of the same time; while, in the interlaced scan, image data of different time is repeated by turns in every other line. The image compression of the MPEG-2 supports the both methods; the CRT display of a computer, however, displays images in the sequential scanning, thereby deteriorating the image quality in displaying the interlaced scanned moving picture due to the motion between fields. Therefore, in order to prevent from this image degradation, it is preferable to perform scan conversion (this meaning will be described later) on a moving picture of the interlaced scan.

While, in a static image of the interlaced scan, there is no motion at any odd line and even line; therefore, it can be converted on a sequential scanning typed display, as it is, with no problem. It is preferable to display a static image as it is, without any scan conversion.

In this background, a method of detecting motion between frames of a moving image is disclosed in Japanese Patent Publication Laid-Open (Kokai) No. Heisei 06-205375, and Japanese Patent Publication (Kokai) Laid-Open No. Showa 62-72287 (hereinafter, referred to as article 1 and article 2 respectively). The method disclosed in the article 1 and the article 2 is a method for detecting motion of an image while comparing the pixel data of the current frame with that one of the prior frame, with the pixel data of the prior frame stored in advance. Further, an example of a digital moving image decoder is disclosed in Japanese Patent Publication Laid-Open (Kokai) No. Heisei 10-191257 (hereinafter, referred to as article 3).

The method disclosed in the article 1 and the article 2 is defective in using extra memory area because of requiring the processing for storing the prior frame into a memory. Further, it is defective in delaying the processing speed because of requiring the processing for detecting motion of the pixel data. The article 3 never includes a way for solving these defects.

SUMMARY OF THE INVENTION

An object of the present invention is to provide an image display device and displaying method capable of judging the portion with motion (moving image portion) and the portion without motion (static image portion) in the images during playback of moving images, in a simpler way than that of the conventional image display device and displaying method.

According to the first aspect of the invention, an image display device for playing-back and displaying binary image data after decoding the above by the frame, comprises image judging means for judging the current frame to be a moving image or a static image, based on time interval between frames which have been decoded in the past, scan converting means for performing scan conversion on the current frame depending on the judgment result by the image judging means, and displaying means for displaying the decoded image through sequential scanning.

According to the present invention, and another embodiment of the present invention, it is designed to judge whether the current frame is a moving image or a static image, based on the time interval between frames having been decoded in the past, thereby making it possible to judge it in a simpler device and method than the conventional one.

In the preferred construction, the image judging means judges the current frame to be a static image when the time interval between the frames is a predetermined value and the more, and judges the current frame to be a moving image when the same time interval is less than the predetermined value.

In another preferred construction, the image judging means makes a judgment on an image, based on the frame one ahead of the current frame and the frame two ahead of the current frame.

In another preferred construction, the image judging means makes a judgment on an image, based on the frame one ahead of the current frame and the frame two ahead of the current frame, when the time interval between the frames is a predetermined value and the more, the image judging means judges the current frame to be a static image, while when the same time interval is less than the predetermined value, the means judges the current frame to be a moving image.

In another preferred construction, the image judging means includes a storing unit for storing the time when each frame is decoded, and a judging unit for making a judgment on an image based on the time stored in the storing unit.

In another preferred construction, the binary image data is an image obtained by interlaced scan, and the frame is formed by a first field and a second field having a difference of a constant time.

In another preferred construction, when the image judging means judges the current frame to be a moving image, the scan converting means performs scan conversion on the current frame.

In another preferred construction, when the image judging means judges the current frame to be a static image, the scan converting means never performs scan conversion on the current frame.

In another preferred construction, when the image judging means judges the current frame to be a moving image, the scan converting means performs scan conversion on the current frame, and, when the image judging means judges the current frame to be a static image, the scan converting means never performs scan conversion on the current frame.

According to the second aspect of the invention, an image display device for playing-back and displaying binary image data after decoding the above by the frame, comprises image judging means for judging the current frame to be a moving image or a static image, based on time interval between frames which have been decoded in the past, scan converting means for performing scan conversion on the current frame depending on the judgment result by the image judging means, sub-picture combining means for combining a sub-picture with the frame, and displaying means for displaying the decoded image through sequential scanning.

In the preferred construction, when the image judging means judges the current frame to be a moving image, the sub-picture combining means combines the sub-picture with the next frame.

In another preferred construction, when the image judging means judges the current frame to be a static image, the sub-picture combining means combines the sub-picture with the current frame.

In another preferred construction, when the image judging means judges the current frame to be a moving image, the sub-picture combining means combines the sub-picture with the next frame, while when the image judging means judges the current frame to be a static image, the sub-picture combining means combines the sub-picture with the current frame.

According to another aspect of the invention, an image displaying method for displaying binary image data after decoding the above by the frame, comprising the steps of an image judging step for judging the current frame to be a moving image or a static image, based on time interval between frames which have been decoded in the past, a scan converting step for performing scan conversion on the current frame, depending on the judgment result in the image judging step, and a displaying step for displaying the decoded image through sequential scanning.

In the preferred construction, in the image judging step, the current frame is judged to be a static image when the time interval between the frames is a predetermined value and the more, and the current frame is judged to be a moving image when the same time interval is less than the predetermined value.

In another preferred construction, a judgment about an image is made, based on the frame one ahead of the current frame and the frame two ahead of the current frame.

In another preferred construction, the image judging step includes a storing step for storing the time when each frame is decoded, and a judging step for making a judgment on an image based on the time stored in the storing step.

In another preferred construction, the binary image data is an image obtained by interlaced scan, and the frame is formed by a first field and a second field having a difference of a constant time.

In another preferred construction, when the current frame is judged to be a moving image in the image judging step, scan conversion is performed on the current frame in the scan converting step.

In another preferred construction, when the current frame is judged to be a static image in the image judging step, scan conversion is never performed on the current frame in the scan converting step.

In another preferred construction, the image displaying method further comprises a sub-picture combining step for combining a sub-picture with the frame.

In another preferred construction, when the current frame is judged to be a moving image in the image judging step, the sub-picture is combined with the next frame in the sub-picture combining step.

In another preferred construction, when the current frame is judged to be a static image in the image judging step, the sub-picture is combined with the current frame in the sub-picture combining step.

In another preferred construction, when the current frame is judged to be a moving image in the image judging step, the sub-picture is combined with the next frame in the sub-picture combining step, while when the current frame is judged to be a static image in the image judging step, the sub-picture is combined with the current frame in the sub-picture combining step.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a flow chart showing the operation of the image display device according to the first embodiment;

FIG. 5 is a block diagram showing the structure of an image display device according to a second embodiment;

FIG. 6 is a flow chart showing the operation of the image display device according to the second embodiment.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The present invention is to improve the playback quality of images, by judging the portion with motion (moving image portion) and the portion without motion (static image portion) during playback of a moving image, in a simpler device than the conventional one, and displaying the above respective portions in a proper way.

Figure 1:
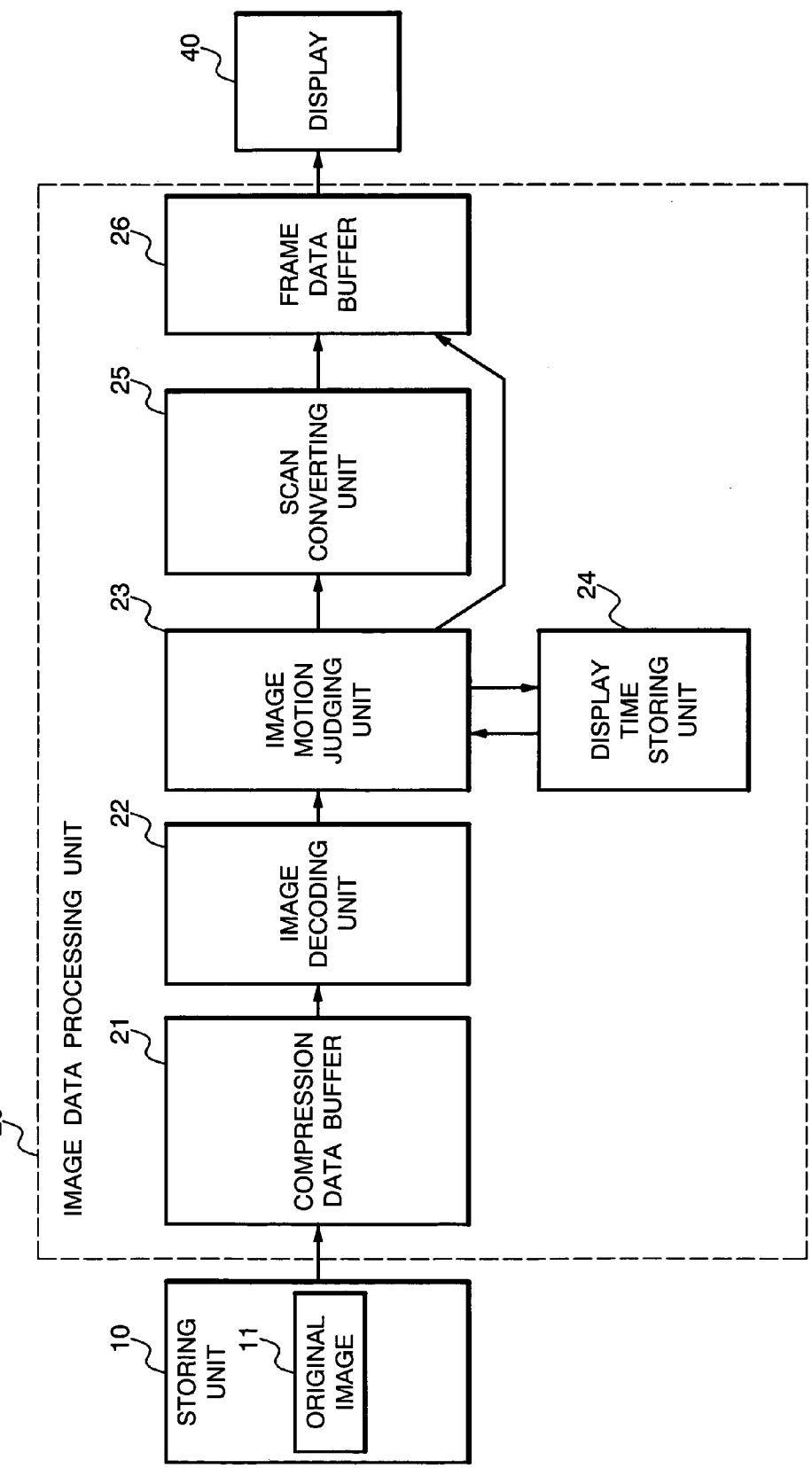
FIG. 1 is a block diagram showing the structure of the best embodiment of an image display device according to the present invention.

FIG. 1 is a view showing the structure of a first embodiment of an image display device according to the present invention. In FIG. 1, the image display device comprises a storing unit 10, an image data processing unit 20, and a display 40. Further, the image data processing unit 20 includes a compression data buffer 21, an image decoding unit 22, an image motion judging unit 23, a display time storing unit 24, a scan converting unit 25, and a frame data buffer 26.

The storing unit 10 stores an original image 11, for example, compressed by the MPEG-2, for example. Assume that the original image 11 comprises the moving image portion and the static image portion within its data. Assume that the decoded image is an image obtained by the interlaced scan and that it has the data of 60 fields (30 frames) a second. The imaged data processing unit 20 decodes the image data (original image 11) loaded from the storing unit 10 and sends the image data to the display 40. Assume that the display 40 is a sequential scanning typed display.

The image obtained by the interlaced scan includes the data having the time difference of 1/60 second for a frame. The data at a time is referred to as the first field, and the data 1/60 second later after the first field is referred to as the second field. The first and second fields have the data in every other line. Simultaneous display of the first field data and the second field data causes the quality degradation due to the motion of the image. Therefore, it is necessary to foresee which value the data of the second field was before 1/60 second (at the same time as the first field) and replace the value of the second field with the resultant value. In a short, the image data of the interlaced scan is converted into the image data of the sequential scanning method. This processing is called scan conversion.

While, of the original data, the portion without motion of the pixel data (static image portion) between fields will not deteriorate in the image quality even if performing no scan conversion and displaying the same portion as it is. It is preferable to perform no scan conversion on the static image portion because the original data can be displayed faithfully.

However, in order not to perform scan conversion on the static image portion, after judging the motion of an image between frames during playback, there is an increase in calculation amount for judging motion of the pixel data and storing the data of the prior frame, and the number of the times for writing into a memory. Therefore, this method is not proper in a situation of making much of speed, like a decoder of the MPEG image data by software. Then, the present invention will propose a device and a method of examining the time interval between frames, for judging the presence of any motion of an image simply according to the length of the time interval. If the time interval between frames is long, it can be judged a static image where no correlation of the data exists between the frames, while if the time interval is short, it can be judged a moving image. Only the examination of the interval between frames can judge a static image or a moving image, thereby speeding up the processing.

A usual moving image has the data for 24 frames to 60 frames per a second, in the MPEG format. That is, the interval between frames is 16.7 msec to 41.7 msec. Accordingly, in examining the time interval between the prior frame and the frame before the prior frame, during the playback of an image, it can be judged that the usual moving image is being reproduced when the interval is, for example, below 50 msec, and that the static image such as a slide show is being displayed when the interval is 50 msec greater.

Accordingly, as for the image data loaded from the storing unit 10 and decoded by the image decoding unit 22 through the compression data buffer 21, the display interval between the prior frame and the frame before the prior frame is calculated by the image motion judging unit 23; the resultant interval divides the case where the data is displayed after being scan-converted by the scan converting unit 25 and the case where it is directly displayed without scan conversion. At this time, the current time is stored in the display time storing unit 24. This time is used for judgment of motion in the next frame. The image data displayed is sent to the frame data buffer 26, and displayed on the display 40.

This time, in the above first embodiment, the operation will be described in the case in which, after loading the original image 11 compressed in the MPEG-2 from the storing unit 10, the compressed MPEG-2 data kept in the compression data buffer 21 is decoded by the image decoding unit 22, the motion of the pixel data within an image is judged by the image motion judging unit 23, and according to the judgment result, the image data is converted from the interlaced scanning data to the sequential scanning data by the scan converting unit 25 and displayed on the display 40.

Figure 2:
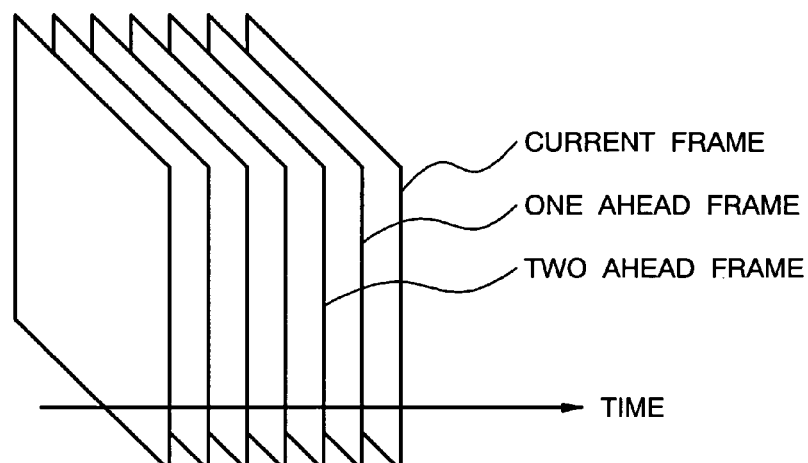
FIG. 2 is a schematic explanatory diagram for use in describing the image display device according to the first embodiment.
Figure 3:
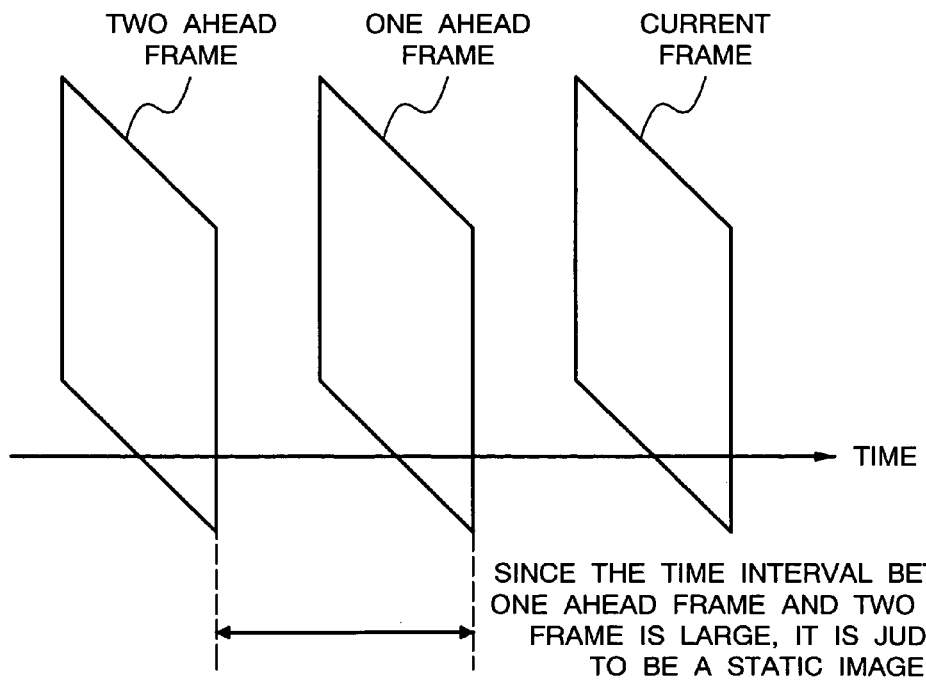
FIG. 3 is a schematic explanatory diagram for use in describing the image display device according to the first embodiment.

FIGS. 2 and 3 are schematic explanatory diagrams for use in describing the first embodiment, and FIG. 4 is a flow chart showing the operation of the first embodiment.

In FIG. 1, the storing unit 10 stores the original image 11 compressed in the MPEG-2 method. Before decoding the compressed image, the image data 11 is loaded in the compression data buffer 21. Then, the compressed image data is decoded by the image decoding unit 22. Assume that the image data is obtained by the interlaced scanning method. Namely, the data includes the image information having different time respectively at even lines and odd lines. The interlaced scan has the field data different in every other line, which causes the sequential scanning typed display to deteriorate in the image quality, due to the motion of an image. Therefore, when displaying an image, it is necessary to convert the interlaced scanned image data into the sequential scanned image data.

When there is no motion in an image, however, no degradation of image quality is caused even if displaying it as it is, without converting the scanning method. Further, in the case of the static image, display of the static image with no scan conversion can be clearer, because the correct image of the sequential scan cannot be always obtained even if performing scan conversion.

In the present invention, whether the frame to be displayed is a frame of the moving image portion or a frame of the static image portion is judged in the following way. When displaying a frame including the original image 11, the time when the data two frames ahead of the frame was displayed is stored. Similarly, the time when the data one frame ahead of the frame was displayed is stored. When displaying the current frame, the difference in the display time of these two past frames is calculated.

As illustrated in FIG. 2, small difference of the time means that the original image 11 is sequentially decoded and displayed; therefore, this data is judged to be a moving image. Since in the data judged to be a moving image, there is a possibility of including a motion in the data of an image, scan conversion is performed on the data, which is displayed on the sequential scanning typed display 40.

On the other hand, large time interval between the two past frames, as illustrated in FIG. 3, indicates that frame data is not frequently updated, which proves that the static image is now being displayed. Since there is no motion in the data of an image at this time, scan conversion is not necessary and the data can be displayed on the display 40 as it is.

This time, a flow of the processing will be described with reference to FIG. 4. Assume that the threshold of the time interval between the two past frames for use in judging whether the original image 11 is a moving image or not, is defined as T (sec). First, the original image 11 is transferred to the compression data buffer 21 (Step 401).

The data stored in the buffer 21 is decoded by the image decoding unit 22 (Step 402). This image has the image data consisting of different times in every line (difference of 1/60 sec.) because of adopting the interlaced scan.

The image motion judging unit 23 examines where this frame is positioned (Steps 403 and 405). In the case of the first frame (in the case of YES in Step 403), since it is impossible to examine the display time of the past frame, with no comparison of the display time, it is regarded as a static image. Then, the current time is stored (Step 404).

In the case of the second frame (in the case of NO in Step 403 and YES in Step 405), since it is impossible to examine the display time of the past frame, with no comparison of the display time, it is regarded as a static image. Then, the current time is stored (Step 404).

In the case of the third frame and the later (in the case of NO in Step 405), a comparison of the display time between the latest two frames is made (Step 406). When the interval of the display time is T sec. and the more (in the case of YES in Step 407), it is judged to be a static image. While, when the interval of the display time is less than T sec. (in the case of NO in Step 407), it is judged to be a moving image. Then, the current time is stored (Step 408).

When it is judged to be a static image, scan conversion is not necessary, and therefore, the decoded video data is transferred to the frame data buffer 26 as it is (Steps 404 and 410). While when it is judged to be a moving image, since scan conversion is necessary, scan conversion is performed by the scan converting unit 25 (Step 409), and the video data is transferred to the frame data buffer 26 (Step 410).

The video data transferred to the frame data buffer 26 is displayed on the display 40 (Step 411). If the display is not completed (in the case of NO in Step 412), this step will be returned to Step 401, where the next frame data is displayed. If the display is completed (in the case of YES in Step 412), the processing will be finished.

This time, the second embodiment of the present invention will be described. The second embodiment is described in the case where the present invention is adopted to a display reproducing unit of DVD (Digital Versatile Disc). This second embodiment proposes a technique for correctly combining a sub-picture after judging motion of video data when the sub-picture (the data of subtitles or the like prepared separately from the video data) is combined with the video during playback of the DVD.

FIG. 5 is a view showing the structure of the second embodiment. In FIG. 5, the same reference numeral is attached to the same structure as that in FIG. 1 (the first embodiment).

With reference to FIG. 5, the second embodiment comprises a storing unit 10 for storing compressed image data, an image data processing unit 20a which operates according to a program control, and a display 40 for displaying the image data. The storing unit 10 includes the original image 11 compressed in the MPEG-2 and sub-picture data 12. The image data processing unit 20a includes a compression data buffer 21 for keeping the image data loaded from the storing unit 10, an image decoding unit 22 for decoding the compressed MPEG-2 data, an image motion judging unit 23 for judging motion of pixel data of an image, a display time storing unit 24 for storing the time when a frame is displayed, a sub-picture combining unit 30 at the time of video decoding, for combining the sub-picture data decoded in the moving image data, with the video data, a frame data buffer 26 for storing the image data displayed, a sub-picture data buffer 27 for keeping the compressed sub-picture data, and a sub-picture combining unit 29 at the time of sub-picture decoding, for combining the sub-picture with the video data when the video data is a static image. The image data decoded by the image data processing unit 20 is displayed on the display 40.

In the DVD, the video data is stored separately from the sub-picture such as the subtitles, and the sub-picture is superimposed on the video data, thereby to be displayed. In the case where the sub-picture is combined and displayed during the moving image playback, if the sub-picture is displayed independent of the video decoding processing at the start time of the sub-picture combination after finishing decoding the sub-picture, there occurs a phenomenon that the same video data as that at the display time on the side of the video decoding processing is displayed, thereby damaging the smoothness in the playback.

More specifically, assuming that the video data is reproduced in the order of the frame 1, 2, 3, and 4 and that the sub-picture is combined and displayed at the time of reproducing the frame 4, the frame 4 will be reproduced again after the frame 4. At this time, which frame 4 the sub-picture is combined with, depends on the internal structure of the image data processing unit 20a.

Thus, since the smoothness is damaged during the playback, combination and display of the sub-picture data is performed on the video data of the frame next to the frame just being reproduced at that time, and display processing is not performed independently on the side of the sub-picture decoding processing.

In the above structure, however, the sub-picture fails to be updated and displayed when only the sub-picture is updated during the playback of the static image data. When the video is the static image data, it is necessary to display the sub-picture independent of the video decoding processing at the time of updating the sub-picture.

As illustrated in FIG. 5, the respective decoding processing of the video and the sub-picture is performed independently by the compression data buffer 21 and the image decoding unit 22, and the sub-picture data buffer 27 and the sub-picture decoding unit 28. The display interval between the two past frames is stored in the display time storing unit 24, and the image motion judging unit 23 makes a judgment about a moving image or a static image. The operation of this judgment is the same as that of the first embodiment. When the original image 11 is judged to be a moving image, since the video frames are displayed one after another, the sub-picture combination and display is started at the next video frame. When the original image 11 is judged to be a static image, the sub-picture combination and display is performed at the time of finishing decoding the sub-picture, independent of the video display.

This time, the operation of the second embodiment will be described. FIG. 6 is a flow chart showing the operation of the second embodiment. Assume that the video data has been decoded and displayed according to the present invention. With reference to FIG. 6, the sub-picture data 12 of FIG. 5 is transferred to the sub-picture data buffer 27 (Step 601). Next, the data stored in the buffer 27 is decoded by the sub-picture decoding unit 28 (Step 602). The display interval between the two past frames of the video data is examined by the image motion judging unit 23 (Step 603). When the interval of the display time is T sec. and the more (in the case of NO in Step 604), it is judged to be a static image. While when the interval of the display time is less than T sec. (in the case of YES in Step 604), it is judged to be a moving image.

When it is judged to be a moving image, the sub-picture is not combined with the video data at once to be transferred to the frame data buffer 26, but waits for the next frame of the video data to be decoded (Step 605), and when the decoded frame is transferred to the frame data buffer 26, the sub-picture is combined with the video data by the video decoding time sub-picture combining unit 30 at (Step 606). While, when it is judged to be a static image, the sub-picture is combined with the video data at once by the sub-picture decoding time sub-picture combining unit 29 (Step 607).

The respectively combined video data is transferred to the frame data buffer 26 (Step 608). The video data transferred to the frame data buffer 26 is displayed on the display 40 (Step 609). If the display is not completed (in the case of NO in Step 610), this step will be returned to Step 601, where the next frame data is displayed (simultaneously the decoding processing of the video data is continued). While if the display is completed (in the case of YES in Step 610), the processing is finished.

The present invention concerns an image display device for displaying the binary image data after decoding it by the frame, which is designed to include an image judging means for judging whether the current frame is a moving image or a static image based on the time interval between the frames having been decoded in the past, thereby enabling the judgment in a simpler device and method than the conventional one.

The other embodiment of the present invention concerns an image displaying method for displaying the binary image data after decoding it by the frame, including an image judging step for judging whether the current frame is a moving image or a static image based on the time interval between the frames having been decoded in the past, thereby making the same effect as that of the above mentioned invention.

Namely, only the check of the display interval, without measuring the motion of the pixel data between the frames, enables a judgment whether there is a motion in an image, and therefore, a circuit required for the measurement of a motion is not necessary, thereby simplifying the structure of the device.

Further, use of the scan conversion for this image judging means and step enables improvement of the display quality of the static image portion. This is because the interlaced scanned image signal is displayed on the sequential scanning typed display as it is, without scan conversion, because of no motion in an image, when it is judged to be a static image portion.

Further, use of this image judging means and step for the sub-picture combination prevents from damaging the smoothness during the playback, because of preventing from displaying one video frame twice at the sub-picture combination time. This is because the sub-picture is combined with the video data of the frame next to the current frame when it is judged to be a moving image portion.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An image display device for playing back and displaying decoded binary image data comprising:
  a decoding unit decoding the binary image data to obtain said decoded binary image data;
  time interval calculating means for calculating a time interval which is an amount of time between a first frame and a second frame of the decoded binary image data;
  a display time storing unit for storing the time interval calculated by the time interval calculating means;
  image judging means for judging whether a third frame is a moving image or a static image based on the time interval stored in the display time storing unit;
  sub-picture combining means for combining a sub-picture with the third frame depending on the judgment by said image judging means; and
  displaying means for displaying the third frame
  when said image judging means judges the third frame to be a moving image, said sub-picture combining means combines the sub-picture with a frame that follows the third frame, while when said image judging means judges the third frame to be a static image, said sub-picture combining means combines the sub-picture with the third frame.

2. An image display device as set forth in claim 1, wherein said image judging means judges the third frame to be a static image when the time interval is greater than or equal to a predetermined value, and judges the third frame to be a moving image when the time interval is less than the predetermined value.

3. An image display device as set forth in claim 1, wherein said image judging means judges the third frame based on the first frame, which is two ahead of the third frame, and the second frame, which is one ahead of the third frame.

4. An image display device as set forth in claim 1, wherein said image judging means judges the third image based on the first frame, which is two ahead of the third frame, and the second frame, which is one ahead of the third frame; and
  when the time interval is greater than or equal to a predetermined value, said image judging means judges the third frame to be a static image, while when the time interval is less than the predetermined value, said means judges the third frame to be a moving image.

5. An image display device as set forth in claim 1, wherein said image judging means includes
  a storing unit for storing times when each frame is decoded, and
  a judging unit for making a judgment on the third frame based on the times stored in said storing unit.

6. An image display device as set forth in claim 1, wherein when said image judging means judges the third frame to be a moving image, said sub-picture combining means combines the sub-picture with a frame that follows the third frame.

7. An image display device as set forth in claim 1, wherein when said image judging means judges the third frame to be a static image, said sub-picture combining means combines the sub-picture with the third frame.

8. An image displaying method for displaying binary image data comprising:
  decoding the binary image data to obtain decoded binary image date;
  decoding sub-picture data associated with said decoded binary image data;
  calculating a time interval which is an amount of time between a first frame and a second frame of said decoded binary image data;
  storing the calculated time interval;
  judging a third frame to be a moving image or a static image, based on the stored, calculated time interval;
  displaying the third frame; and
  a sub-picture combining step for combining a sub-picture with the third frame
  when the third frame is judged to be a moving image in said image judging step, the sub-picture is combined with a frame that follows the third frame, while when the third frame is judged to be a static image in said image judging step, the sub-picture is combined with the third frame in said sub-picture combining step.

9. An image display device for playing-back and displaying binary image data after decoding the binary image data, comprising:
a display time storing unit for storing a time interval between a first frame and a second frame of said decoded binary image data;
image judging unit which judges a third frame to be a moving image or a static image, based on the time interval between the first frame and the second frame stored in the display time storing unit;
sub-picture combining unit which combines a sub-picture with the third frame depending on a judgment result by said image judging means; and
display unit which displays the third frame
when the third frame is judged to be a moving image in said image judging step, the sub-picture is combined with a frame that follows the third frame, while when the third frame is judged to be a static image in said image judging step, the sub-picture is combined with the third frame in said sub-picture combining step.

10. An image display device as set forth in claim 9, wherein
said image judging unit judges the third frame to be a static image when the time interval is greater than or equal to a predetermined value, and judges the third frame to be a moving image when the time interval is less than the predetermined value.

11. An image display device as set forth in claim 9, wherein
said image judging unit makes a judgment on the third frame based on a frame one ahead of the current frame and a frame two ahead of the current frame.

12. An image display device as set forth in claim 9, wherein
said image judging unit makes a judgment on the third frame based on a frame one ahead of the third frame and a frame two ahead of the third frame;
when the time interval is greater than or equal to a predetermined value, said image judging unit judges the third frame to be a static image, while when the time interval is less than the predetermined value, said image judging unit judges the third frame to be a moving image.

* * * * *